United States Patent
Lu et al.

(10) Patent No.: US 8,140,895 B2
(45) Date of Patent: Mar. 20, 2012

(54) METHOD AND SYSTEM FOR RECOVERING SIP TRANSACTION

(75) Inventors: Wei Lu, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/846,990

(22) Filed: Jul. 30, 2010

(65) Prior Publication Data

US 2011/0029812 A1 Feb. 3, 2011

(30) Foreign Application Priority Data

Jul. 31, 2009 (CN) .......................... 2009 1 0161455

(51) Int. Cl.
*G06F 11/00* (2006.01)
(52) U.S. Cl. ............................. 714/15; 714/4.11; 714/18
(58) Field of Classification Search ........................ None
See application file for complete search history.

(56) References Cited

U.S. PATENT DOCUMENTS

| | | | |
|---|---|---|---|
| 2003/0204769 A1* | 10/2003 | Coughlin | 714/4 |
| 2005/0021616 A1 | 1/2005 | Rajahalme | |
| 2006/0265376 A1 | 11/2006 | Tagane | |
| 2007/0076855 A1* | 4/2007 | MeLampy et al. | 379/88.17 |
| 2008/0183991 A1* | 7/2008 | Cosmadopoulos et al. | 711/162 |

OTHER PUBLICATIONS

Bozinovski, M.; Gavrilovska, L.; Ramjee Prasad; , "A state-sharing mechanism for providing reliable SIP sessions," Telecommunications in Modern Satellite, Cable and Broadcasting Service, 2003. TELSIKS 2003. 6th International Conference on , vol. 1, No., pp. 384-387 vol. 1, Oct. 1-3, 2003.*

* cited by examiner

*Primary Examiner* — Scott Baderman
*Assistant Examiner* — Jason Bryan
(74) *Attorney, Agent, or Firm* — Vazken Alexanian

(57) ABSTRACT

A method and system for recovering a SIP transaction. The method including monitoring an event related to transaction change; recording information related to the event; and regenerating a transaction by use of the recorded information upon failover. A system is also provided to carry out the steps of the method. Through the present invention, a transaction may be regenerated upon occurrence of failure during the transaction period, thereby enabling transaction-level failover and noticeably reducing the information load needed to recorded compared with the prior art. The present invention not only improves reliability of a SIP-based service but also requires less overhead for transaction recovery.

16 Claims, 8 Drawing Sheets

METHOD AND SYSTEM FOR RECOVERING SIP TRANSACTION

CROSS-REFERENCE TO RELATED APPLICATIONS

This application claims priority under 35 U.S.C. §119 from Chinese Patent Application No. 200910161455.0, filed Jul. 31, 2009, the entire contents of which are incorporated herein by reference.

TECHNICAL FIELD OF THE INVENTION

The present invention relates to Session Initiation Protocol (SIP), and more particularly, relates to a method and system for recovering a SIP transaction.

DESCRIPTION OF THE RELATED ART

SIP is an application layer protocol proposed and sponsored by the Internet Engineering Task Force (IETF), for creating, modifying and terminating sessions with one or more participants. From the SDP (Session Description Protocol) specification, a multimedia session is a set of multimedia senders and receivers and the data streams flowing from senders to receivers. A multimedia conference is a typical example of a multimedia session. In the case that a session is required to be controlled, the SIP may be extended as an application layer control protocol. SIP may be widely applied in fields such as internet telephony call, multimedia distribution, and multimedia conference, etc. Further, as a protocol for IP telephony and other multimedia applications, SIP has been widely recognized by the telecommunications and enterprise communication industries.

Most of SIP-based services relate to multimedia applications, and it is generally perceived that SIP-based services should be more reliable than internet-based services. Therefore, the reliability of SIP sessions is crucial to guarantee the reliability of SIP-based services such that they will be widely accepted. To this end, there are a variety of technologies for SIP failover in the prior art. Two of the major technologies are "intelligent failover at previous hop" and "intelligent failover at redundant hop."

FIG. 1 schematically shows a view of the "intelligent failover at previous hop" technology according to the prior art. In the failover technology as shown in FIG. 1, SIP user agent (SIP UA) of the previous hop element is responsible for detecting a failure of a SIP server and performs failover by receiving and sending a SIP message in an alternative SIP server upon detection of the failure.

FIG. 2 schematically shows a view of the "intelligent failover at redundant hop" technology according to the prior art. In the technology as shown in FIG. 2, there is additionally provided a redundant hop such as a load balancer, a network dispatcher or an IP sprayer. The redundant hop is responsible for detecting a failure of a SIP server in a cluster and performing failover upon occurrence of failure by dispatching a SIP message to a SIP server as a failover target. In this technology, the redundant hop is transparent to each element of the SIP, and the upstream element SIP US will not notice the failure and thus needs no execution of any action to the failure.

For the two technical solutions as shown in FIG. 1 and FIG. 2, if the SIP server is a stateful SIP element, then the SIP server is required to support failover. Thus, it is required to replicate the SIP session state to a different location in a manner of database replication or memory-to-memory replication, such that when it needs another SIP server to take over the operation due to occurrence of failure, the other SIP server can recover the session with the replicated information.

The prior art failover technologies provide failover to SIP routing or to SIP session/SIP dialogue. However, when failure occurs during a SIP transaction for establishing a session, terminating a session, registering contact information, and querying server load, etc, the existing technical solution is to use a backup SIP server to restart the transaction, thus it is impossible for them to perform a transaction-level failover.

A direct solution to implement such transaction-level failure recovery is to replicate the transaction itself. However, this is pragmatic due to too much system overhead. For example, to maintain transaction objects for each SIP transaction, i.e., request objects, response objects, transaction state machine, and timers, it approximately requires a 10 KB-30 KB memory capacity. In the case of replicating the transaction, it further needs to be serialized and converted into byte data for transmission, which will cause the data size to be inflated 10 times, i.e., the data size for each SIP transaction will be 100 KB-300 KB. Assuming there are 1000 messages per second and each message will cause state change of transactions, the data size required to be replicated in one second will be about 100 MB-300 MB. This is not practical both for an application server and a data storage.

SUMMARY OF THE INVENTION

Accordingly, an aspect of the present invention provides a method for recovering a SIP transaction, including: monitoring an event related to transaction change; recording information related to the event; and regenerating a traction by use of the recorded information upon failover.

According to another aspect of the present invention, there is provided a system for recovering a SIP transaction. The system includes: an event monitoring means for monitoring an event related to transaction change; an information recording means for recording information related to the event; and a regenerating means for regenerating a transaction by use of the recorded information upon failover.

Through various aspects of the present invention, a transaction may be regenerated, upon occurrence of failure during a SIP transaction, with less recorded information related to transaction change event, thereby implementing a transaction-level failover. In addition, compared with a traditional technology of implementing SIP transaction recovery through replicating the transaction itself, the amount of information needed to be recorded for implementing recovery is noticeably reduced. The present invention can not only improve the reliability of a SIP-based service but also reduce the system overhead, and thus the technology according to the present invention is more practical and feasible.

DETAILED DESCRIPTION OF THE PREFERRED EMBODIMENTS

Figure 1:
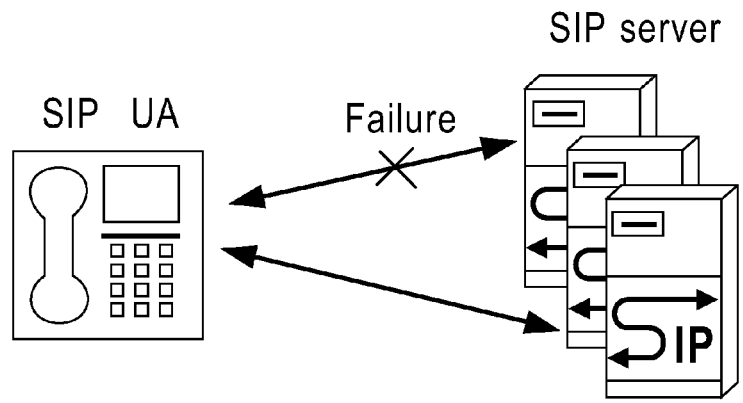
FIG. 1 schematically shows a view of an intelligent failover at previous hop according to the prior art.
Figure 2:
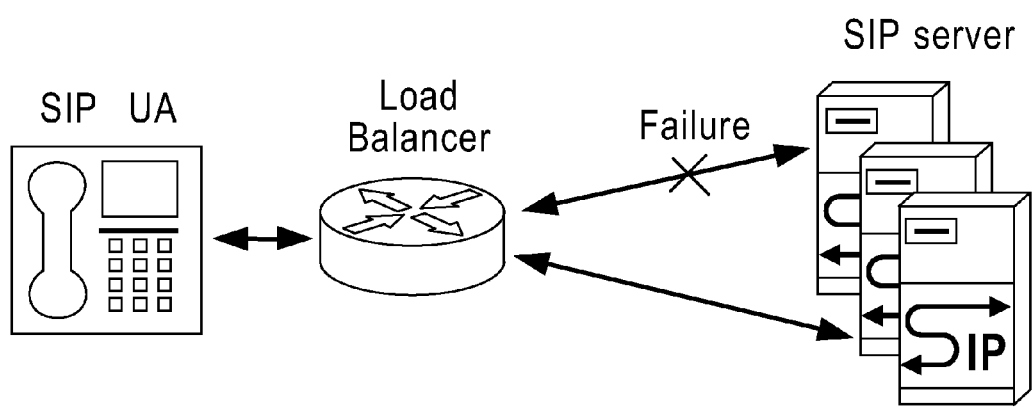
FIG. 2 schematically shows a view of an intelligent failover at redundant hop according to the prior art.

Hereinafter, a method and system for recovering a SIP transaction according to the present invention will be described in detail through embodiments with reference to the drawings. Like reference signs in the drawings indicate like or similar components.

Before the method and system according to the present invention are described in detail, some terms and related prior arts will be firstly explained briefly so as to make the present invention more comprehensible. From the definition in SIP specification, the term "transaction" refers to an event proceeding between a client and a server, for establishing a session, terminating a session, registering contact information, and querying server load, etc. A SIP transaction typically includes one or more SIP messages communicated between a client and a server. Generally, a transaction includes a request message for creating the transaction and all responses transmitted from the server till a final response message. In other words, this includes a request message, provisional responses (1xx responses) and final responses (non-1xx responses). For an INVITE request, if a final response is a non-2xx response, in other words, not a response indicating a successful processing, then the transaction further includes an ACK message for acknowledging the non-2xx response. Additionally, it should be noted that the ACK message for 2xx response of an INVITE request is an independent transaction.

Figure 3:
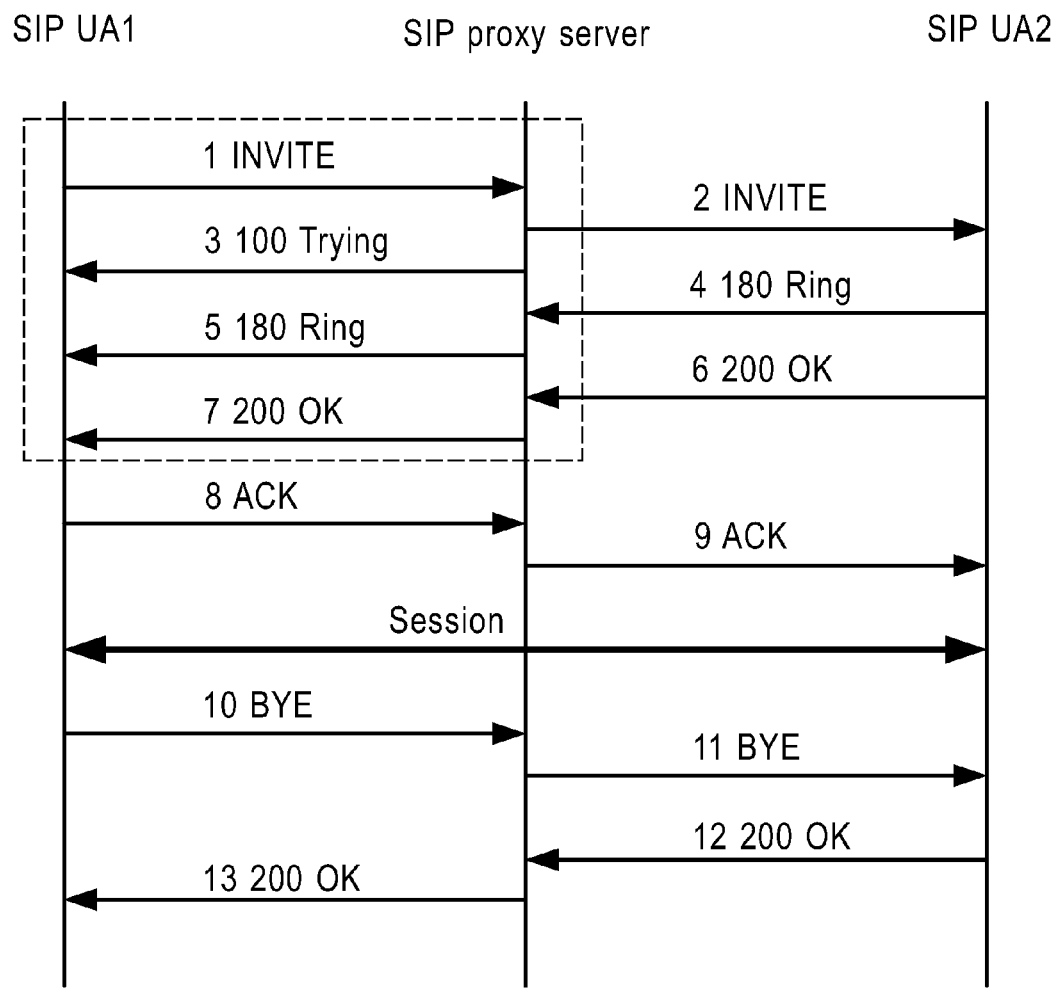
FIG. 3 shows an example of session process.

FIG. 3 schematically shows a normal process of performing a session between SIP UA1 and SIP UA2 via a SIP proxy server. In this figure, there are altogether 3 transactions running between the SIP UA1 and the SIP proxy server, i.e., a transaction for establishing a session, including 1 INVITE, 3 100 trying, 5 180 Ring, and 7 200 OK messages; a transaction for acknowledging the session establishment, including 8 ACK message; and a transaction for terminating the session, including 10 BYE and 13 200 OK messages. There are also 3 transactions running between the SIP proxy server and the SIP UA2, i.e., a transaction for establishing a session, including 2 INVITE, 4 180 Ring, 6 200 OK messages; a transaction for acknowledging the session establishment, including 9 ACK message; and a transaction for terminating the session, including 11 BYE and 12 200 OK messages. After 9 ACK, the communication between the SIP UA1 and the SIP UA2 is SIP session/dialogue. In a two-party communication, the SIP session is a SIP dialogue; and in a more than three-party communication, a communication between each two parties is a SIP dialogue, and all SIP dialogues together form a SIP session. The session process as shown in FIG. 3 is known to the skilled in the art, which will not be detailed here.

In order to process transactions with the SIP UA1, the stateful SIP proxy server as shown in FIG. 3 will create a corresponding server transaction for each transaction to maintain the state of each transaction; likewise, in order to process transactions with the SIP UA2, the SIP proxy server will create a corresponding client transaction for each transaction. Each server transaction has its own state as well as a state machine for controlling state change logic.

Figure 4:
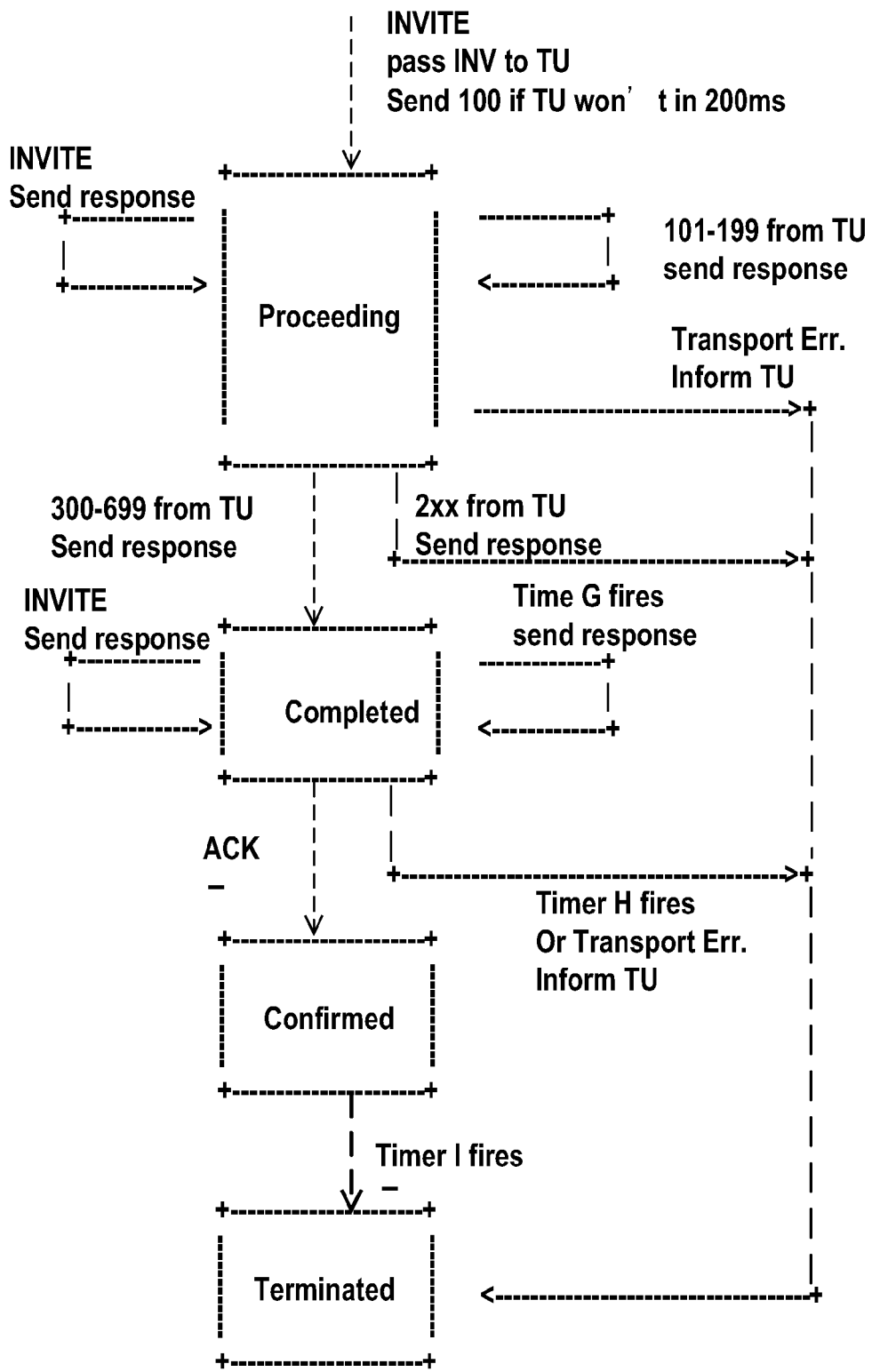
FIG. 4 shows a state machine of an INVITE server transaction.

FIG. 4 shows a state machine of an INVITE server transaction. An INVITE server transaction is created by the SIP proxy server to process an INVITE transaction with the SIP UA1. The state machine of the transaction not only covers processing under normal conditions as shown in FIG. 3 but also covers processing under various conditions such as transmission error, reception of a final response indicating unsuccessful processing (300-699 message), etc.

As shown in FIG. 4, the state machine involves 4 states, i.e., "proceeding", "completed", "confirmed", and "terminated". The server transaction responds to the SIP UA1 and performs state change based on the received messages (messages received from the SIP UA1 and messages received from a Transaction User TU) under a logic prescribed by the state machine.

It should be noted that, from the definition in SIP specification, besides the above INVITE server transaction, there are also INVITE client transaction, non-INVITE server transaction, and non-INVITE client transaction. Different types of transactions may involve different states, for example, for an INVITE client transaction, it involves "calling" state, "proceeding" state, "completed" state, and "terminated" state. For the detailed description of different types of transactions, of their states, and of their state machine, please refer to SIP RFC 3271, which will not be detailed here.

Figure 5:
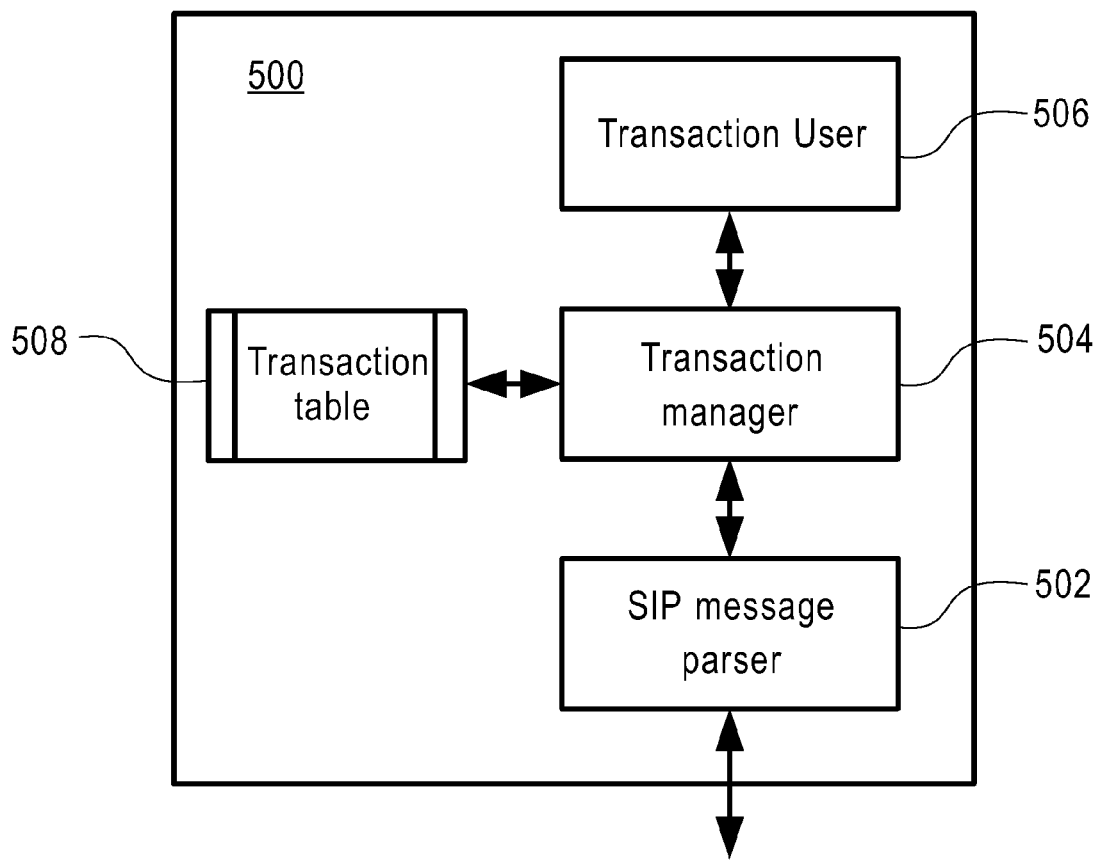
FIG. 5 schematically shows an example of a SIP server 1 for processing a SIP message implemented according to the prior art.

FIG. 5 schematically shows an example of a SIP server 1 for processing a SIP message implemented according to the prior art. The SIP server 500 includes a SIP message parser 502, a transaction manager 504, a transaction user (TU) 506, and a transaction table 508. The SIP message parser is configured for parsing a SIP message and transmitting the parsed SIP message to the transaction manager 504. The transaction manager 504 is responsible for managing all transactions being processed by the SIP server and transmitting the received SIP message to the TU 506, and hands the SIP message required to be transmitted by the TU 506 to a communication layer for transmitting. The TU 506 is located on a protocol layer above the transaction layer. For the transaction manager 504, the TU 506 is upper-layer application logic. The transaction manager 504 is responsible for managing all proceeding transactions and storing a transaction object list of each being processed transaction in a transaction table 508. For each transaction, its transaction list includes various kinds of related events and information, for example, received SIP messages, transmitted SIP messages, various kinds of overtime events, message receiving events, message transmitting events, state change events, current state of the state machine, etc., and the transaction manager is further responsible for driving the state machine.

Figure 6:
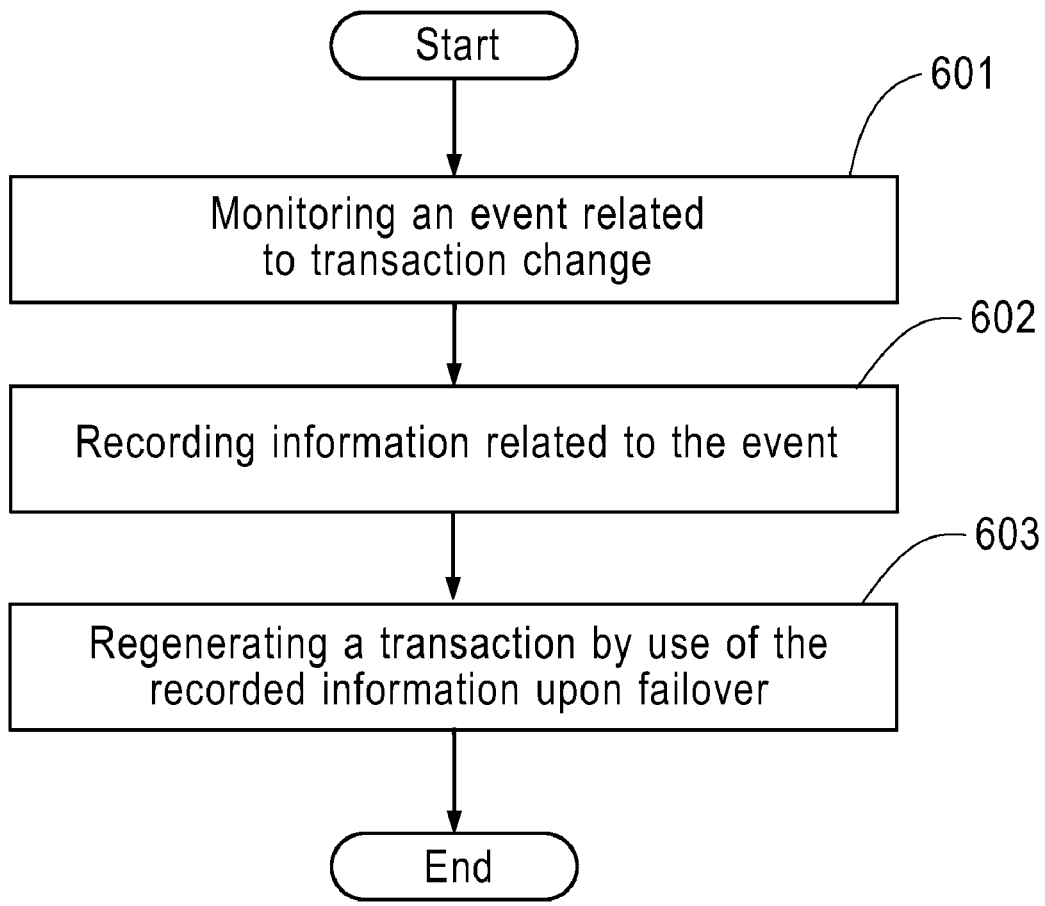
FIG. 6 schematically shows a flow chart of a method for recovering a SIP transaction according to an embodiment of the present invention.

FIG. 6 shows a flow chart of a method for recovering a SIP transaction according to a preferred embodiment of the present invention. As shown in FIG. 6, at step 601, an event related to transaction change is monitored. At step 602, information related to the event is recorded. At step 603, a transaction is regenerated by use of the recorded information upon failover.

Figure 7:
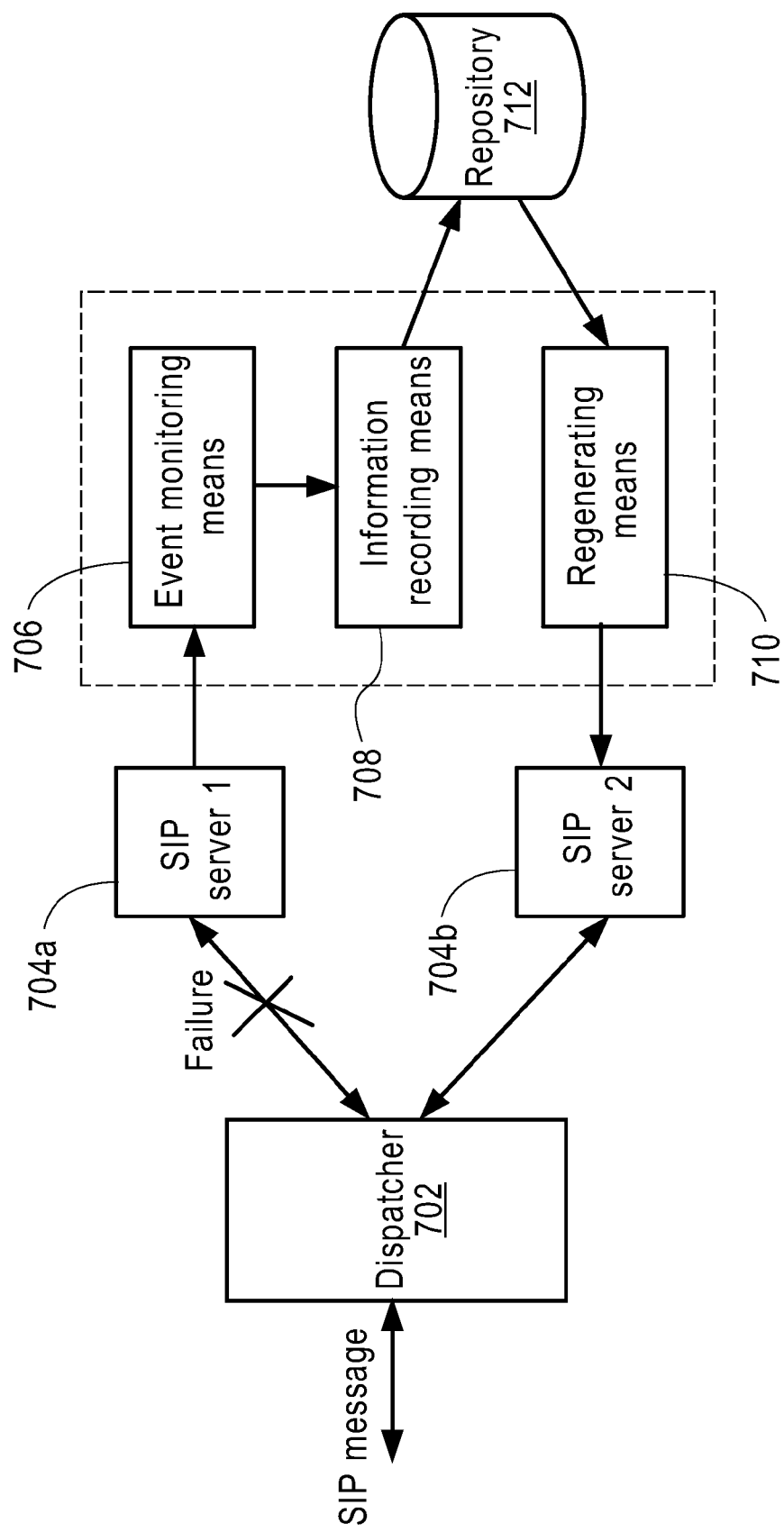
FIG. 7 schematically shows a diagram of a process for performing SIP failover according to the present invention.

FIG. 7 shows a diagram of a process for performing SIP failover according to the present invention. As shown in FIG. 7, firstly, a dispatcher 702 receives an external SIP message. The dispatcher 702 for dispatching SIP messages transmits, based on some information in the SIP messages, for example, hash value or IP address of the call ID header, SIP messages belonging to a same transaction to a same SIP server for processing, for example transmitting to a SIP server 1 704*a*. According to the present invention, a transaction change-related event is monitored through listening to the SIP server 1 704*a*.

Among the events stored in the transaction table 508, events such as message receiving events, message transmitting events, and state change events, etc, are events potentially changing the transaction. Thus, for example, event monitoring means 706 in FIG. 7 may monitor the transaction change-related events by listening to those events in the SIP transaction manger.

According to an embodiment of the present invention, transaction change-related events may include a transaction creating event, and a transaction state change event. Further, transaction change-related events may further include a response event. These events may be obtained by listening to various events in the SIP transaction manager.

A transaction creating event is an event of creating a corresponding transaction object for processing a new transaction. For a client transaction, the transaction creating event occurs upon transmitting a new SIP request message and may be monitored by listening to a message transmitting event corresponding to the request message. For a server transaction, a transaction creating event occurs upon receiving a new SIP request message and may be monitored by listening to a message receiving event corresponding to the request message. Upon occurrence of the transaction creating message, a stateful SIP proxy server will create a server transaction or a client transaction, i.e., generating a corresponding transaction object which typically includes a request object for processing a request message and a state machine corresponding to the request, so as to maintain the state of the transaction.

A state change event refers to an event that a transaction changes between various stated defined by a state machine under the drive of a SIP message. A state change event of a transaction may be monitored by listening to a state change event in the SIP transaction manager. There are different state change events for different transaction types.

A response event refers to an event of receiving or transmitting a provisional response or a final response. For a client transaction, this event occurs upon receipt of the provisional response or the final response; while for a server transaction, a response event occurs when the provisional response or final response for a SIP request is returned to a user agent (UA). Upon occurrence of a response event, a response object will be established for the response, so as to process the received response or the response to be transmitted. It should be noted that different response objects need be established for different responses. A response event can indicate the current progress of the transaction and reflect, to a certain extent, the current state of the transaction.

For the INVITE server transaction as shown in FIGS. 3 and 4, a transaction creating event refers to an event of creating an INVITE server transaction for the request when the SIP proxy server receives an INVITE request; a response event refers to an event of transmitting a provisional response such as, inter alia, 100 Trying and 180 Ring or a final response such as 200 OK to the SIP UA1, or an event of retransmitting the response upon reception of a retransmission request from the client or upon not receiving the response from the SIP UA1; and a transaction state change event refers to an event that the transaction state changes between "proceeding" state, "completed" state, "confirmed" state, and "terminated" state.

For an INVITE client event established by the SIP proxy server to process an INVITE event with the SIP UA2, a transaction creating event is an event of creating an INVITE client transaction for the INVITE request when the SIP proxy server is to forward the request to the SIP UA2; a response event is an event of receiving a provisional response or a final response from the SIP UA2; and a transaction state change event refers to an event that the transaction state changes between "calling", "proceeding" state, "completed" state, and "terminated" state.

From the definition in SIP specification, besides the above INVITE server transaction and INVITE client transaction, there are also non-INVITE client transaction and non-INVITE server transaction. These transactions all involve an issue of transaction recovery. Since the fundamental principles for recovering these transactions are identical, description of the present invention will be made hereinafter mainly with the INVITE server transaction and INVITE client transaction as examples. As to other transactions and their state machines, please refer to corresponding depiction in SIP RFC 3261.

Further, it should be noted that in different circumstances, the events required for monitoring may be different.

For a server transaction, the transaction change-related events may include a transaction creating event, a response event, and a transaction state change event. The transaction creating event is monitored so as to monitor the state of a request object for creating the transaction, the response event is monitored so as to record the state of a response object for processing the response; while the transaction state change event is monitored so as to monitor the state of the state machine.

For a transaction such as ones only including one SIP message, for example an ACK response for a 2xx response to an INVITE request, it is a special transaction. Events related to the transaction change may only include creating the transaction, not involving the response. It is because after receiving the ACK response, the SIP server will not be further required to transmit any response for the transaction. Additionally, for an ACK message for 200 OK, it may not be monitored, because based on the SIP protocol, during failover, the ACK transaction of 200 OK may be regenerated in the responsibility of the transaction user TU.

A final response may not be monitored. However, in order to guarantee correct reference of the final response by other objects, the event of final response is preferably recorded.

For a client transaction, events related to transaction change may include a transaction creating event and a transaction state change event, without a response event, i.e., the response event is optional. It is because the response processing related to the client transaction is mainly to process its received response and transmit it to the transaction user. Thus, during recovery, a corresponding response object may be generated upon receiving the corresponding response. However, preferably, even if for the client transaction, the response event may still be monitored, i.e., the events relates to the transaction change still include a response, such that in the case of no subsequent response after the failure, a more accurate recovery transaction is still enabled. Of course, the transaction change-related events may only include a transaction creating event. In this case, the recovery is directed to the initial state after establishment of the transaction.

Next, returning to FIG. 6, at step 602, information related to the event is recorded. When a transaction change-related event is monitored, for example, information recording means 708 as shown in FIG. 7 may record information related to the event.

Similar to the above events required to be monitored, information related to the transaction change event also varies with the transactions. According to the present invention, information related to the transaction change event may include one or more of text message of the request, text message of the response, current state of the transaction, and timestamp of transaction state change.

In an embodiment of the present invention, the above information related to transaction change is recorded by replicating the text message of the request, text message of the response, current state of the transaction, and timestamp of transaction state change to for example a repository 712 from a transaction table 508. This replication may adopt a database replication manner or a memory-to-memory replication manner.

It should be noted that besides the above text replication manner, the information carried in the messages may be obtained by parsing the request and response text messages, such that only the information carried therein is recorded. However, this manner required addition of a parsing component, which reduces the recorded information load while also bringing additional overhead to the system. Thus, comparatively speaking, the manner of text replication is preferable because it is much simpler.

Referring back to FIG. 6, at step 603, during failover, a transaction may be regenerated by use of the recorded information. Upon detection of occurrence of failure during the transaction period, a subsequent SIP message will be transmitted to a failover target server (the SIP server 2 704b as shown in FIG. 7) to perform failover. During performing failover, for example the regenerating means 710 as shown in FIG. 7 may automatically acquire information which has been recorded and related to the transaction being processed by a failed SIP server, so as to recover the SIP transaction.

Preferably, in response to the failover target server unable to find a transaction for processing its received SIP message, the regenerating means 710 acquires corresponding information so as to perform regeneration of the transaction. It is a manner of processing on demand, and the transaction recovery is only performed when necessary. In these cases, system overhead may be reduced. For example, in the case that the failover target server receives a SIP message that has already belonged to another new transaction, it will be unnecessary to perform transaction recovery, but just need to establish a new transaction. Thus, in this case, some unnecessary operations may be omitted so as to reduce system overhead.

Hereinafter, regeneration of a transaction will be described with reference to the INVITE server transaction as shown in FIGS. 3 and 4.

According to an embodiment of the present invention, the steps of regenerating a transaction may include: recovering a request object based on the text message of the request, and recovering a state machine based on the current state of the transaction.

This will occur, for example, in the case of receiving the INVITE request but having not transmitted the 100 Trying response to the SIP UA1 yet, as shown in FIG. 3. At this time, only the text message of the request and the state of the state machine are recorded. At this point, a request object may be recovered from the recorded text message of the request, i.e., like the processing performed by the SIP server 1 704a upon receipt of a new INVITE request, generating an internal expression of the request object based on the requested text message, and generating, based on the current state (i.e., "proceeding" state) of the recorded transaction, a state machine in a "proceeding" state. In this way, the transaction is regenerated, thereby recovering the transaction. In addition, it may also occur in the case of client transaction as above mentioned, wherein responses may not be recorded for the client transaction, while a corresponding object is generated by the failover target server upon receiving the response. However, for the same reason as above mentioned, i.e., the transaction recover can also be comparatively accurate in the case of no subsequent response after the failure, it is still preferable for the client to record the corresponding response and recover the response object based on the recorded response during performing failover.

According to another embodiment of the present invention, the steps of regenerating a transaction may further include recovering the response object from the text message of a latest response, besides the steps of recovering the request object from the text message of the request and recovering the state machine based on the current state of the transaction as above described. It will occur upon occurrence of failure after the SIP proxy server transmits the 100 Trying response or 180 Ring response to the SIP UA1. In this case, it is further required to regenerate a response object for the latest response from the text message of the latest response, as in the case when the SIP server 1 receives the response, so as to guarantee that the recovered transaction is capable of retransmitting the latest transmitted response to the SIP UA 1 when receiving the retransmission request from the SIP UA1.

According to another embodiment of the present invention, the step of regenerating a transaction further includes determining an already set timer based on the current state of the transaction and recovering the timer object based on the time of transaction state change and the current time. It should be noted that a timer will be used in certain state of the state machine, for example, as shown in FIG. 4, a timer G and a timer H are started in the "completed" state of the INVITE server transaction, a timer I is started in the "confirmed" state; while a timer A and a timer B are started in the "calling" state of the INVITE client transaction, and a timer D is started in the "completed" state. At this point, it is further necessary to determine which timer objects are set based on the state of the transaction, and to determine, based on the timestamp of state change and the current time, in which state these timers should be, thereby recovering the timer object.

The present invention has been described above with reference to the embodiments, however, the present invention is not limited thereto. A method according to the present invention may further include deleting information irrelevant to the being monitored transaction. In order to recover the transaction, it is only necessary to monitor the information of the proceeding transaction, while irrelevant information, for example, information about a terminated transaction, may not be saved so as to save memory space. According to the present invention, upon monitoring a new transaction creating event, the information irrelevant to the currently proceeding transaction may be deleted, the deletion may be performed periodically according to a predetermined time interval, or alternatively, the deletion may be performed when the memory load reaches a preset threshold.

Furthermore, preferably, according to the embodiment of the present invention, old information in the information related to the event may be further deleted such that only latest information of the current transaction is saved so as to further save space. For example, for the INVITE server transaction of the SIP proxy server as shown in FIG. 3, after the SIP proxy server monitors a new response event of transmitting the 180 Ring and more preferably after the text message of the new response 180 Ring has been recorded, text information of the old response 100 Trying as previously recorded may be deleted. Further, as shown in FIG. 4, when an event that the INVITE server transaction has changed from the "proceeding" state to the "completed" state is monitored, and more preferably after the new state (i.e., "completed" state) and the state change time (the time of entering into the "completed" state) of the transaction has been recorded, the previously recorded transaction state information (i.e., the "proceeding"

state) and the state change time (the time of entering into the "proceeding" state) may be deleted.

It should be noted that the operations for monitoring and recording as described in step 601 and step 602 may be performed outside the SIP server or inside the SIP server, as long as the event-related information is stored at a location outside the SIP server. Thus, when it needs handover due to failure of SIP server, the information recorded therein may be used to perform SIP transaction recovery.

It should be noted that the operation of regenerating a transaction as described in step 603 may be performed outside the failover target server, and in the case, after the transaction object of the transaction is regenerated, it needs to be serialized so as to transmit it to the failover target server, and re-obtain the generated transaction object by performing deserialization at the failover target server. However, it is preferable to perform the above re-generalization at the failover target server, so as to omit the operations of serialization and deserialization.

Further, it should be noted that the present invention may be used in combination with any failover solution in the prior art, thereby implementing transaction-level failover.

Additionally, it should be noted that for the purpose of illustration, the method for recovering a SIP transaction according to the present invention has been described above with reference to the SIP proxy server. However, the present invention is not limited thereto, and besides application to a SIP proxy server, the present invention may also be applied to a SIP registration server, a SIP application server, or any other SIP server for processing SIP messages.

Further, the method according to the present invention has been described in conjunction with the INVITE server transaction and the INVITE client transaction, but the present invention is not limited thereto. The present application may also be applied to a non-INVITE client transaction and a non-INVITE server transaction. The skilled in the art would appreciate that when applied to other transactions, the fundamental principles of the operation of the present invention are identical to the application to INVITE server and client transactions. The skilled in the art who are familiar with INVITE server transaction, INVITE client transaction, non-INVITE server transaction, and non-INVITE client transaction, after reading the disclosure of the present invention, may easily understand the operations to the non-INVITE server transaction and to the non-INVITE client transaction. Thus, it will not be detailed here.

From the above description of the method of the present invention with reference to the preferred embodiments, it can be seen that through the method of the present invention, a transaction object of a transaction may be generated based on recorded less information related to the transaction change event upon occurrence of failure during the transaction, such that a transaction is regenerated to recover the SIP transaction, thereby realizing a transaction-level failover. In addition, compared with a traditional technology of implementing SIP transaction recovery through replicating the transaction itself, the amount of information needed to be recorded for implementing recovery is noticeably reduced. The present invention can not only improve the reliability of a SIP-based service but also reduce the system overhead, and thus the technology according to the present invention is more practical and feasible.

Figure 8:
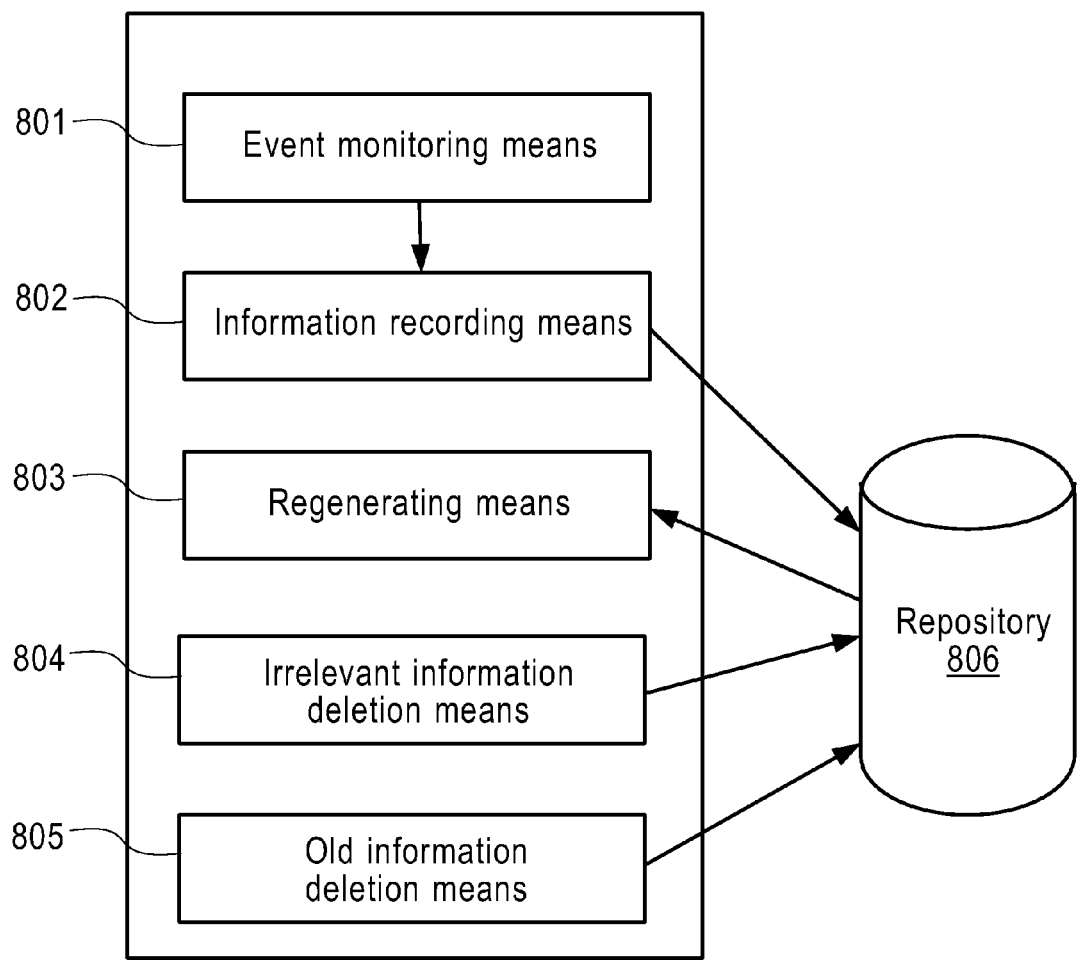
FIG. 8 shows an embodiment of a system according to an embodiment of the present invention.

FIG. 8 shows a system 800 for recovering a SIP transaction according to an embodiment of the present invention. In order to clearly explain the relationship between components of the system according to the present invention, a repository 806 is shown.

The system 800 as shown in FIG. 8 includes: event monitoring means 801 for monitoring an event related to transaction change; information recording means 802 for recording information related to the event, for example storing it in the repository 806; and regenerating means 803 for regenerating a transaction by use of the recorded information upon failover.

According to an embodiment of the present invention, the transaction change-related events may include a transaction creating event, and a transaction state change event. Further, the transaction change-related events may further include a response.

According to another embodiment of the present invention, information related to the event may include one or more of text message of the request, text message of the response, current state of the transaction, and time of transaction state change.

According to a further embodiment of the present invention, the regenerating means 803 may further be configured to recover a request object based on the text message of the request, and to recover a state machine based on the current state of the transaction.

According to a still further embodiment of the present invention, the regenerating means 803 may be further configured to recover a response object based on the text message of the latest response.

According to another embodiment of the present invention, the regenerating means 803 may be further configured to determine an already set timer based on the current state of the transaction and to recover the timer object based on the time of transaction state change and the current time.

According to a yet further embodiment, the regenerating means 803 may be configured to regenerate a transaction in response to the failover target server not finding a transaction for its received SIP message.

According to a still further embodiment of the present invention, the system 800 may further includes irrelevant information deletion means 804 for deleting information irrelevant to the being monitored transaction from the repository 806, so as to save memory space.

According to a yet further embodiment of the present invention, the system 800 may further includes old information deletion means 805 for deleting old information among the information related to the event from the repository 806, so as to further save memory space.

For detailed operations of the event monitoring means 801, information recording means 802, regenerating means 803, irrelevant information deletion means 804, and old information deletion means 805 in the above embodiments, please refer to the detailed description on the method according to the present invention with reference to FIGS. 5-7.

Figure 9:
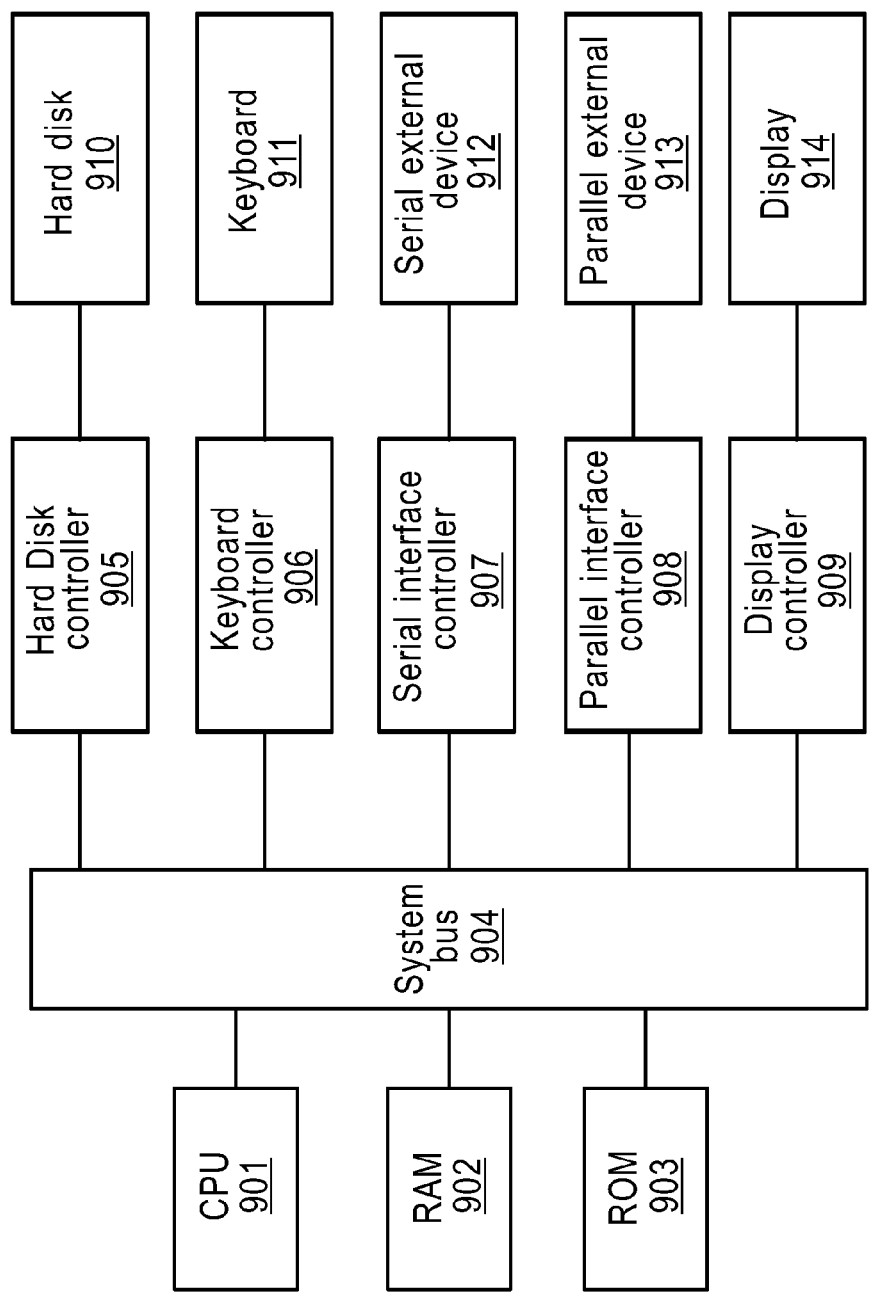
FIG. 9 shows a structural block diagram of a computer device in which the embodiments according to the present invention can be implemented.

FIG. 9 shows a structural block diagram of a computer device capable of implementing the embodiments according to the present invention. The computer system as shown in FIG. 9 includes a CPU (Central Processing Unit) 901, a RAM (Random Access Memory) 902, a ROM (Read Only Memory) 903, a system bus 904, a hard disk controller 905, a keyboard controller 906, a serial interface controller 907, a parallel interface controller 908, a monitor controller 909, a hard disk 910, a keyboard 911, a serial peripheral device 912, a parallel peripheral device 913 and a display 914. Among these components, connected to the system bus 904 are the CPU 901, the RAM 902, the ROM 903, the hard disk controller 905, the keyboard controller 906, the serial interface controller 907, the parallel controller 908 and the monitor controller 909. The hard disk 910 is connected to the hard disk controller 905; the keyboard 911 is connected to the keyboard controller 906; the serial peripheral device 912 is connected to the serial interface controller 907; the parallel peripheral device 913 is connected to the parallel interface controller 908; and the display 914 is connected to the monitor controller 909.

The structural block diagram in FIG. 9 is shown only for illustration purpose, and is not intended to limit the invention. In some cases, some devices can be added or reduced as required.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. The normally skilled in the art may understand that the above method and system may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

While the present invention has been described with reference to the embodiments of the present invention considered by far, it should be understood that the invention is not limited to the embodiments disclosed herein. On the contrary, all modifications and equivalent arrangements that fall within the spirit and range of the appended claims are intended to be embraced therein. The scope of the appended claims is accorded with the broadest interpretation to encompass all such modifications and equivalent structures and functions.

What is claimed is:

1. A method for recovering a session initiation protocol transaction, comprising:
   monitoring an event related to transaction change;
   recording information related to the event; and
   regenerating a transaction by use of recorded information upon failover;
   wherein;
      the information related to the event comprises a text message of a request, a current state of a transaction, and a transaction state change time; and
      the step of regenerating the transaction further comprises (i) recovering a request object of the transaction from the text message of the request, (ii) recovering a state machine of the transaction from the current state of the transaction, (iii) determining an already set timer of the transaction based on current state of the transaction, and (iv) recovering an object corresponding to the timer based on the transaction state change time and the current time.

2. The method according to claim 1, wherein the event related to transaction change comprises a transaction creating event.

3. The method according to claim 1, wherein the event related to transaction change further comprises transaction state change event.

4. The method according to claim 1, wherein the event related to transaction change further comprises a response event.

5. The method according to claim 1 wherein:
   the information related to the event further comprises a text message of a response; and
   the step of regenerating the transaction further comprises recovering a response object of the transaction from a text message of a latest response.

6. The method according to claim 1, wherein the transaction is regenerated in response to a failover target server not finding a transaction for processing its received session initiation protocol message.

7. The method according to claim 1, further comprising:
   deleting information irrelevant to the transaction being monitored.

8. The method according to claim 1, further comprising:
   deleting old information from the information related to the event.

9. A system for recovering a session initiation protocol transaction, comprising:
   an event monitoring means for monitoring an event related to transaction change;
   an information recording means for recording information related to the event; and
   a regenerating means for regenerating a transaction by use of the recorded information upon failover;
   wherein
      the information related to the event comprises a text message of a request, a current state of a transaction, and transaction state change time; and
      the regenerating means is further configured to (i) recover a request object of the transaction from the text message of the request,(ii) recover a state machine of the transaction from the current state of the transaction, (iii) determine already set timers of the transaction based on current state of the transaction, and (iv) recover an object corresponding to the timer based on the transaction state change time and the current time.

10. The system according to claim 9, wherein the event related to transaction change comprises a transaction creating event.

11. The system according to claim 9, wherein the event related to transaction change further comprises transaction state change event.

12. The system according to claim 9, wherein the event related to transaction change further comprises a response event.

13. The system according to claim 9, wherein:
   the information related to the event further comprises a text message of a response; and
   the regenerating means is further configured to recover a response object of the transaction from a text message of a latest response.

14. The system according to claim 9, wherein the regenerating means is configured to regenerate the transaction in response to a failover target server not finding a transaction for processing its received session initiation protocol message.

15. The system according to claim 9, further comprising:
   irrelevant information deletion means for deleting information irrelevant to the transaction being monitored.

16. The system according to claim 9, further comprising:
   old information deletion means for deleting old information from the information related to the event.

\* \* \* \* \*